United States Patent
Hitaka

(10) Patent No.: US 10,303,712 B2
(45) Date of Patent: May 28, 2019

(54) IMAGE RETRIEVAL APPARATUS THAT RETRIEVES DESIRED IMAGE FROM CONSECUTIVE IMAGES, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Yosato Hitaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/608,435

(22) Filed: May 30, 2017

(65) Prior Publication Data
US 2017/0351707 A1    Dec. 7, 2017

(30) Foreign Application Priority Data

Jun. 1, 2016   (JP) ................................ 2016-110034

(51) Int. Cl.
| | | |
|---|---|---|
| G06K 9/00 | (2006.01) | |
| G06F 16/583 | (2019.01) | |
| G06T 7/00 | (2017.01) | |
| G06F 16/783 | (2019.01) | |

(52) U.S. Cl.
CPC ...... *G06F 16/5838* (2019.01); *G06F 16/7837* (2019.01); *G06K 9/00765* (2013.01); *G06T 7/97* (2017.01); *G06T 2207/20021* (2013.01)

(58) Field of Classification Search
CPC .......... G06F 17/30256; G06F 17/3079; G06K 9/00765; G06T 7/97; G06T 2207/20021
USPC ........ 382/100, 103, 107, 305; 345/173, 156, 345/157, 640; 715/702, 704, 716, 715/719–726
See application file for complete search history.

(56) References Cited

U.S. PATENT DOCUMENTS

| | | | | |
|---|---|---|---|---|
| 6,618,375 | B2 * | 9/2003 | Rezaiifar | H04L 1/1809 370/394 |
| 7,508,366 | B2 * | 3/2009 | Shiomi | G09G 3/3648 345/87 |
| 8,718,444 | B2 * | 5/2014 | Miura | G06K 9/4652 386/248 |

(Continued)

FOREIGN PATENT DOCUMENTS

| | | | |
|---|---|---|---|
| JP | 2009-177507 | * | 8/2009 |
| JP | 2009-177507 A | | 8/2009 |

*Primary Examiner* — Sheela C Chawan
(74) *Attorney, Agent, or Firm* — Cowan, Liebowitz & Latman, P.C.

(57) ABSTRACT

An image retrieval apparatus capable of retrieving a desired image from images shot continuously in a short time. A display control unit displays the images on a display unit in order in a first or second transition direction according to a user's operation. A setting unit sets up a limit point in the first (second) transition direction when the direction in which the images are displayed in order is switched from the first (second) transition direction to the second (first) transition direction based on an image displayed at a time of switching. The display control unit stops displaying the images in order in the first (second) transition direction when a displayed image reaches an image corresponding to the limit point in the first (second) transition direction during the images are displayed in order in the first (second) transition direction.

18 Claims, 10 Drawing Sheets

(56) References Cited

U.S. PATENT DOCUMENTS

| | | | | |
|---|---|---|---|---|
| 9,454,303 B2* | 9/2016 | Andres | ................ | G11B 27/005 |
| 2002/0089994 A1* | 7/2002 | Leach, Jr. | ................ | H04L 1/08 |
| | | | | 370/412 |
| 2010/0225952 A1* | 9/2010 | Nakagawa | ......... | H04N 1/00132 |
| | | | | 358/1.14 |
| 2016/0119576 A1* | 4/2016 | Takeda | ................... | H04N 5/772 |
| | | | | 348/220.1 |

* cited by examiner

FIG. 6A
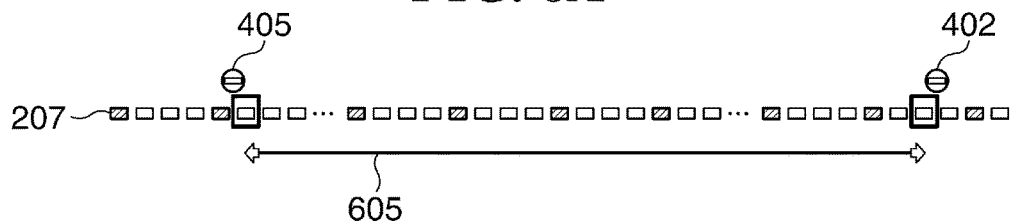
FIG. 6B
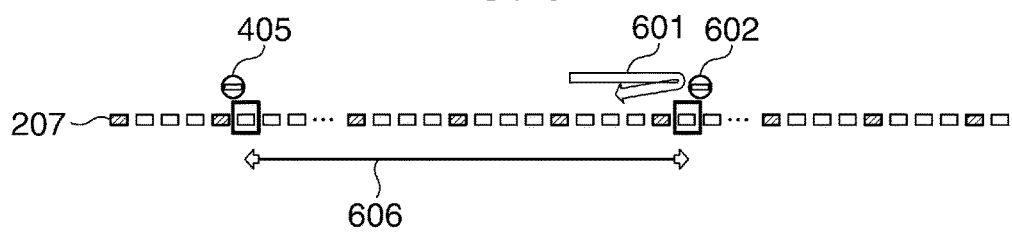
FIG. 6C
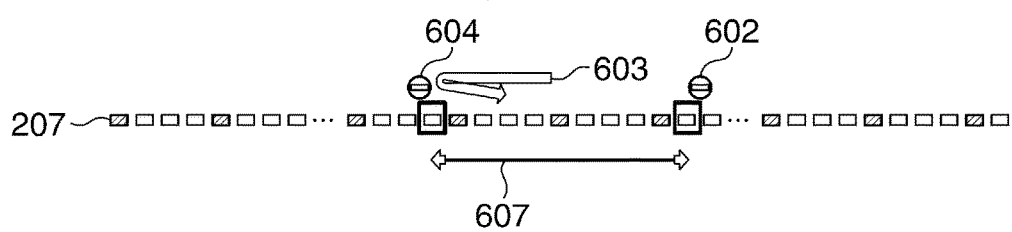
FIG. 7
| NUMBER OF FRAMES BETWEEN LIMIT POINTS | TRANSITION SPEED (RATIO) |
|---|---|
| (INITIAL VALUE) | 100% |
| 1000 OR LESS | 50% |
| 500 OR LESS | 30% |
| 100 OR LESS | 25% |
| 50 OR LESS | 10% |

| LIMIT POINT IN REWINDING DIRECTION | LIMIT POINT IN FORWARDING DIRECTION |
|---|---|
| 1 | 20000 |
| 3000 | 3450 |
| 3100 | 3200 |
|  | 3125 |
|  | 3110 |

| LIMIT POINT IN REWINDING DIRECTION | LIMIT POINT IN FORWARDING DIRECTION |
|---|---|
| 1 | 20000 |
| 3000 | 3450 |
| 3100 | 3200 |
|  | 3125 |
|  |  |

IMAGE RETRIEVAL APPARATUS THAT RETRIEVES DESIRED IMAGE FROM CONSECUTIVE IMAGES, CONTROL METHOD THEREFOR, AND STORAGE MEDIUM STORING CONTROL PROGRAM THEREFOR

BACKGROUND OF THE INVENTION

Field of the Invention

The present invention relates to an image retrieval apparatus, a control method therefor, and a storage medium storing a control program therefor, and in particular, relates to an image retrieval apparatus that retrieves a desired image from consecutive images, such as a video image.

Description of the Related Art

Large capacity media, such as hard disks and optical disks, become widespread as media that records a video image in recent years. Moreover, a user easily edits a video image by using an image retrieval apparatus equipped with a video image edit function. As an editing of a video image, there are static image creation, frame searches for dividing a video image and for adding a chapter, etc.

Incidentally, when a user retrieves a target frame using an image retrieval apparatus, the user forwards frames of a video image. Then, the user stops the forwarding near the target frame, and performs a fast transition or a slow transition by repeating a frame forwarding or a frame rewinding (see Japanese Laid-Open Patent Publication (Kokai) No. 2009-177507 (JP 2009-177507A)).

However, since the video reproducing apparatus disclosed in the above-mentioned publication has no limit to restrict a transition range in the frame forwarding or the frame rewinding, the image transition process may be performed outside the target frame. That is, the transition process may be performed in a direction away from the target frame (target image), which requires time until the user retrieves the target image.

SUMMARY OF THE INVENTION

The present invention provides an image retrieval apparatus, a control method therefor, and a storage medium storing a control program therefor that are capable of retrieving an image that a user desires in a short time.

Accordingly, a first aspect of the present invention provides an image retrieval apparatus that retrieves a predetermined image from a plurality of images shot continuously, the image retrieval apparatus including a display control unit configured to display the plurality of images on a display unit in order in either of a first transition direction and a second transition direction that is opposite to the first transition direction according to a user's operation, and a setting unit configured to set up a limit point in the first transition direction when the direction in which the images are displayed in order is switched from the first transition direction to the second transition direction based on an image displayed at a time of switching concerned, and to set up a limit point in the second transition direction when the direction in which the images are displayed in order is switched from the second transition direction to the first transition direction based on an image displayed at a time of switching concerned. The display control unit stops displaying the images in order in the first transition direction when a displayed image reaches an image corresponding to the limit point in the first transition direction during the images are displayed in order in the first transition direction, and stops displaying the images in order in the second transition direction when a displayed image reaches an image corresponding to the limit point in the second transition direction during the images are displayed in order in the second transition direction.

Accordingly, a second aspect of the present invention provides a control method for an image retrieval apparatus that retrieves a predetermined image from a plurality of images shot continuously, the control method including a display control step of displaying the plurality of images on a display unit in order in either of a first transition direction and a second transition direction that is opposite to the first transition direction according to a user's operation, a first setting step of setting up a limit point in the first transition direction when the direction in which the images are displayed in order is switched from the first transition direction to the second transition direction based on an image displayed at a time of switching concerned, a second setting step of setting up a limit point in the second transition direction when the direction in which the images are displayed in order is switched from the second transition direction to the first transition direction based on an image displayed at a time of switching concerned, a first stop step of stopping displaying the images in order in the first transition direction when a displayed image reaches an image corresponding to the limit point in the first transition direction during the images are displayed in order in the first transition direction, and a second stop step of stopping displaying the images in order in the second transition direction when a displayed image reaches an image corresponding to the limit point in the second transition direction during the images are displayed in order in the second transition direction.

Accordingly, a third aspect of the present invention provides a non-transitory computer-readable storage medium storing a control program causing a computer to execute the control method of the second aspect.

According to the present invention, the limit point is set up for each transition direction when a plurality of images are displayed sequentially. When the transition reaches the limit point concerned, the display of images in the current transition direction stops. As a result of this, an image distant from the desired image does not displayed, which enables the user to retrieve the desired image easily in a short time.

Further features of the present invention will become apparent from the following description of exemplary embodiments with reference to the attached drawings.

BRIEF DESCRIPTION OF THE DRAWINGS

FIG. 6A, FIG. 6B, and FIG. 6C are views for describing update of the limit points that has been described with reference to FIG. 3A and FIG. 3B.

FIG. 7 is a view showing an example of data used in calculation of a transition speed in the image transition process described with reference to FIG. 3A and FIG. 3B.

DESCRIPTION OF THE EMBODIMENTS

Hereafter, embodiments of image retrieval apparatuses according to the present invention will be described in detail with reference to the drawings.

Figure 1:
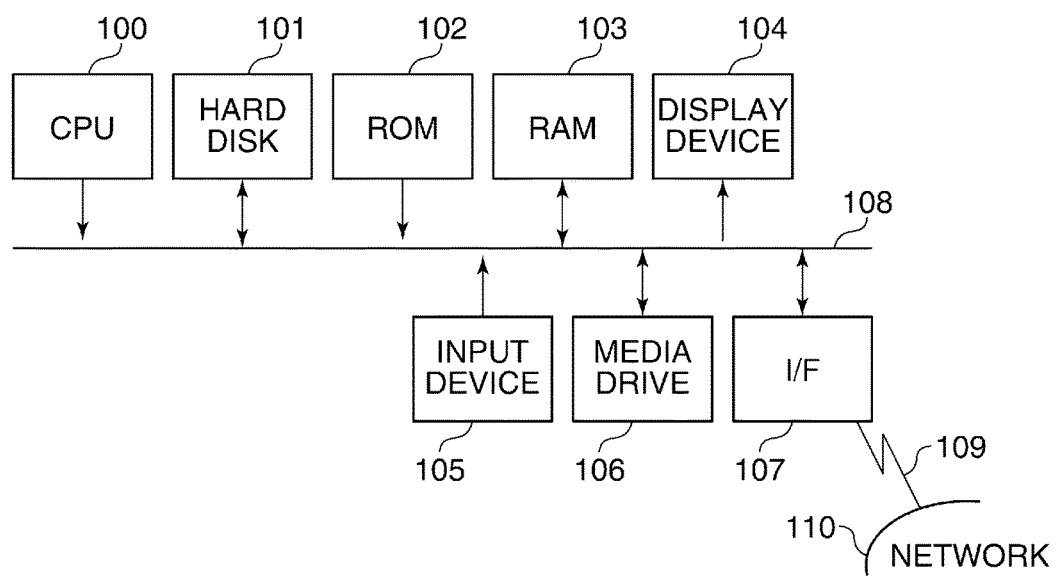
FIG. 1 is a block diagram schematically showing a configuration of an image retrieval apparatus according to a first embodiment of the present invention.

FIG. 1 is a block diagram schematically showing a configuration of an image retrieval apparatus according to a first embodiment of the present invention.

The illustrated image retrieval apparatus is used when reproducing consecutive images, such as a video image, obtained by an image pickup apparatus, such as a digital camera. The image retrieval apparatus has a CPU 100 that controls the entire image retrieval apparatus. A hard disk drive (hereinafter, referred to as an HDD) 101 stores application programs, data, an image library, etc. A ROM 102 stores operation process procedures (for example, programs for a startup process, a basic input/output process, etc. of the image retrieval apparatus) of the CPU 100. A RAM 103 is used as a main memory of the CPU 100. Furthermore, various programs including a control program for performing a below-mentioned process are loaded to the RAM 103 from the hard disk 101 etc., and the CPU 100 runs the programs concerned. Moreover, the RAM 103 is used as a work area at the time of execution of various processes by the CPU 100.

Various kinds of information will be displayed on a display device (display unit) 104 under the control of the CPU 100. An input device 105 recognizes an operation process by an operation on a screen. That is, the input device 105 is equipped with a touch panel etc. Furthermore, a pointing device, a keyboard, etc. are used as the input device 105.

A detachable storage medium, which stores image data etc., is attached to a storage-medium loading unit (media drive) 106. A network interface (I/F) 107 is connected with a network 110 via a communication line 109. The image retrieval apparatus receives data like image data from an external apparatus and sends data to the external apparatus via the I/F 107. It should be noted that the above-mentioned units are mutually connected via a system bus (an address bus, a data bus, and a control bus) 108.

It should be noted that the image retrieval apparatus shown in FIG. 1 processes consecutive images, such as a video image including a plurality of moving image frames.

Moreover, the consecutive images may be a plurality of static images taken by continuous shooting, and may be image data that consists of a plurality of static images taken by normal shooting and arranged in order of shot time.

Figure 2A:
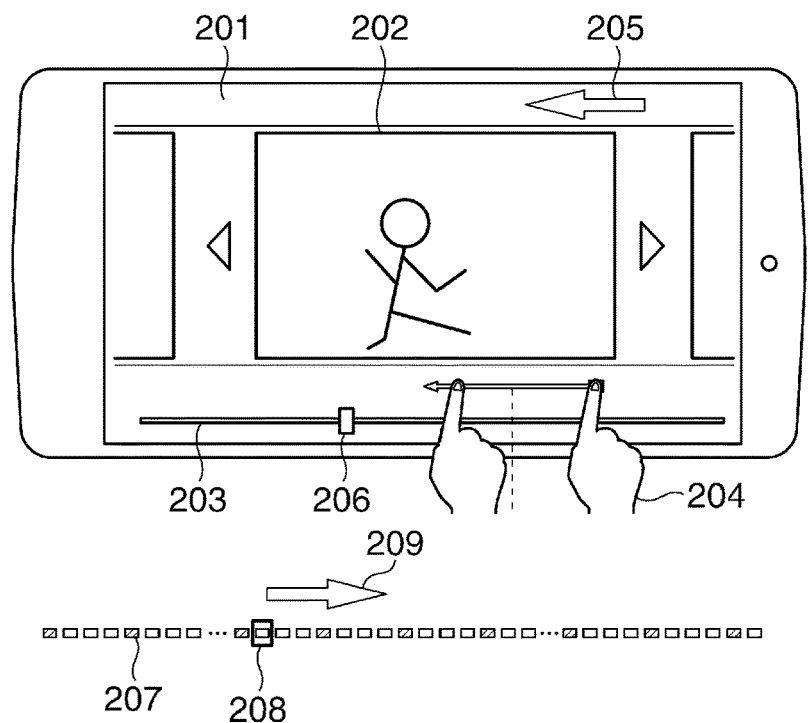
FIG. 2A and FIG. 2B are views for describing an example of an operation screen displayed on a display device of the image retrieval apparatus shown in FIG. 1.
Figure 2B:
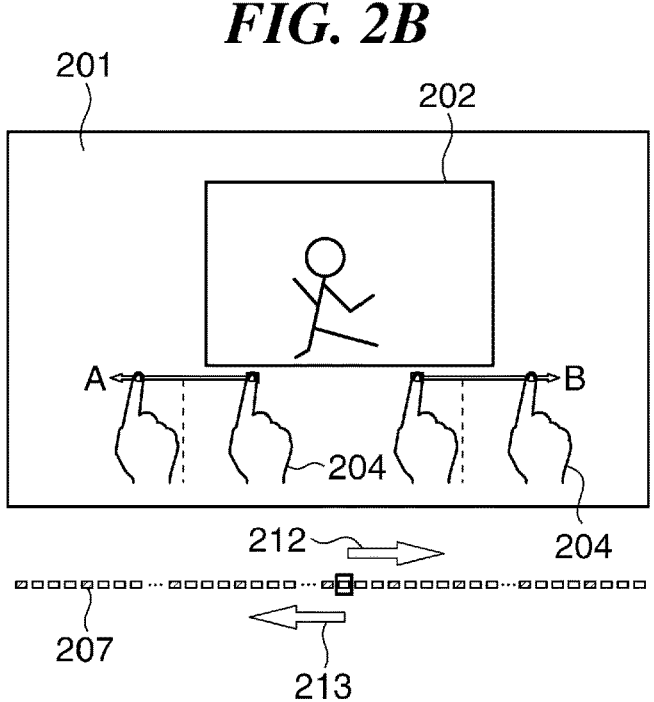

FIG. 2A and FIG. 2B are views for describing an example of an operation screen displayed on the display device 104 of the image retrieval apparatus shown in FIG. 1. Then, FIG. 2A is a view showing the operation screen through which an operation of instructing the image transition is received. FIG. 2B is a view showing a transition direction of the operation screen by an image transition operation.

As shown in FIG. 2A, the display device 104 is provided with a display panel 201 on which images, such as a video image, are displayed. It should be noted that the display panel 201 is used as a touch panel that detects a touch operation, such as a finger operation.

An image, such as a video image frame or a static image, is displayed in a transitional image display area 202 of the display panel 201, for example. A time line 203 is a line along which moving image frames or static images are arranged in time series. A current position cursor 206 indicates a position of a video image frame displayed in the transitional image display area 202 within the entire video image. It should be noted that the current position cursor 206 indicates a position of a static image displayed in the transitional image display area 202 among all the static images that are arranged in order of shot time, for example, in the case where the processing target is a series of static images.

An operating body 204 is a finger or a pen, for example. The CPU 100 detects transition operations, such as a flick operation, swipe operation, and drag operation, by the operating body 204 on the display panel 201. When detecting a transition operation, the CPU 100 performs transition of images displayed in the transitional image display area 202 according to a moving amount, operation frequency, and moving speed of the operating body 204. For example, the CPU 100 performs fast transition of images in response to a flick operation. The CPU 100 performs slow transition of images in response to a swipe operation or a drag operation. It should be noted that the CPU 100 changes an image transition speed corresponding to the number and speed of transition operations.

An arrow 205 indicates an image transition direction in the transitional image display area 202. When a transition operation from right to left in FIG. 2A is performed by the operating body 204, the displayed images transit so that images flow from right to left, and an old image is replaced by a new image in time series.

A video image stream 207 shows a time series sequence of moving image frames that constitute a video image or static images. A displayed image mark 208 indicates a position of an image displayed in the transitional image display area 202 within the video image stream 207. Then, the displayed image mark 208 indicate an image (current position image) that is indicated by the current position cursor 206 in the time line 203. Moreover, an arrow 209 shows a moving direction of the displayed image mark 208. When images displayed in the transitional image display area 202 transit from right to left in FIG. 2A as shown by the arrow 209, the displayed image mark 208 moves from a left position indicating an old image to a right position indicating a new image in time series.

Subsequently, when the operating body 204 is operated from right to left on the display panel 201 as shown by an arrow A as shown in FIG. 2B, the CPU 100 displays images in the transitional image display area 202 so as to flow from right to left. The operation direction in this case is referred to as a "forwarding direction". In this case, the displayed image mark 208 on the video image stream 207 moves from left to right as shown by an arrow 212, i.e., from a position indicating an old image toward a position indicating a new image in time series.

On the other hand, when the operating body 204 is operated from left to right on the display panel 201 as by an arrow B, the CPU 100 displays images in the transitional image display area 202 so as to flow from left to right. The operation direction in this case is referred to as a "rewinding direction". The displayed image mark 208 on the video image stream 207 moves from right to left as shown by an arrow 213, i.e., from a position indicating a new image toward a position indicating an old image in time series. The rewinding direction is opposite to the forwarding direction.

When retrieving a target image, a user operates with a flick operation so as to perform image transition at high speed. When a rough position of the target image is known, the user operates with a swipe operation so as to perform slow image transition near the target image. By transiting the images displayed in the transitional image display area 202 at high speed, the position near the target image can be reached quickly. On the other hand, when the images are transited at high speed, the user is difficult to recognize the image displayed in the transitional image display area 202. Accordingly, since the images displayed in the transitional image display area 202 are transited slowly after reaching the rough position of the target image (predetermined image), the target image can be easily retrieved.

Thus, in the process for retrieving the target image, images are transited in the forwarding direction and the rewinding direction first at high speed to find the rough position of the target image. Subsequently, when the target image is approached, images are transited at low speed and the target image is easily retrieved.

Hereinafter, it is assumed that a target image is retrieved from a video image, and a process for retrieving a target frame image from frame images that constitute the video image will be described for convenience of description.

Figure 3A:
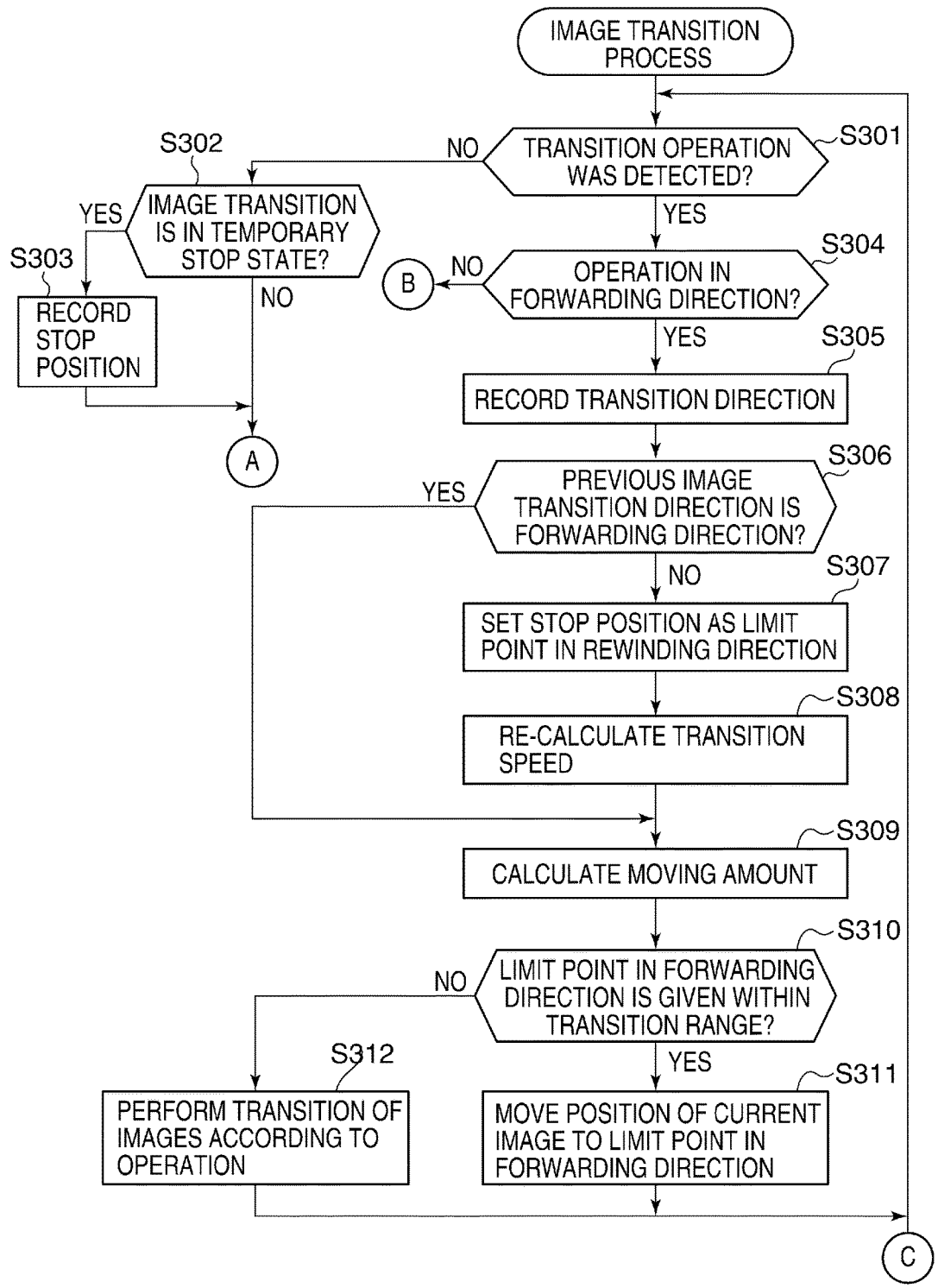
FIG. 3A is a flowchart showing a part of an image transition process for retrieving a target image frame performed by the image retrieval apparatus shown in FIG. 1.
Figure 3B:
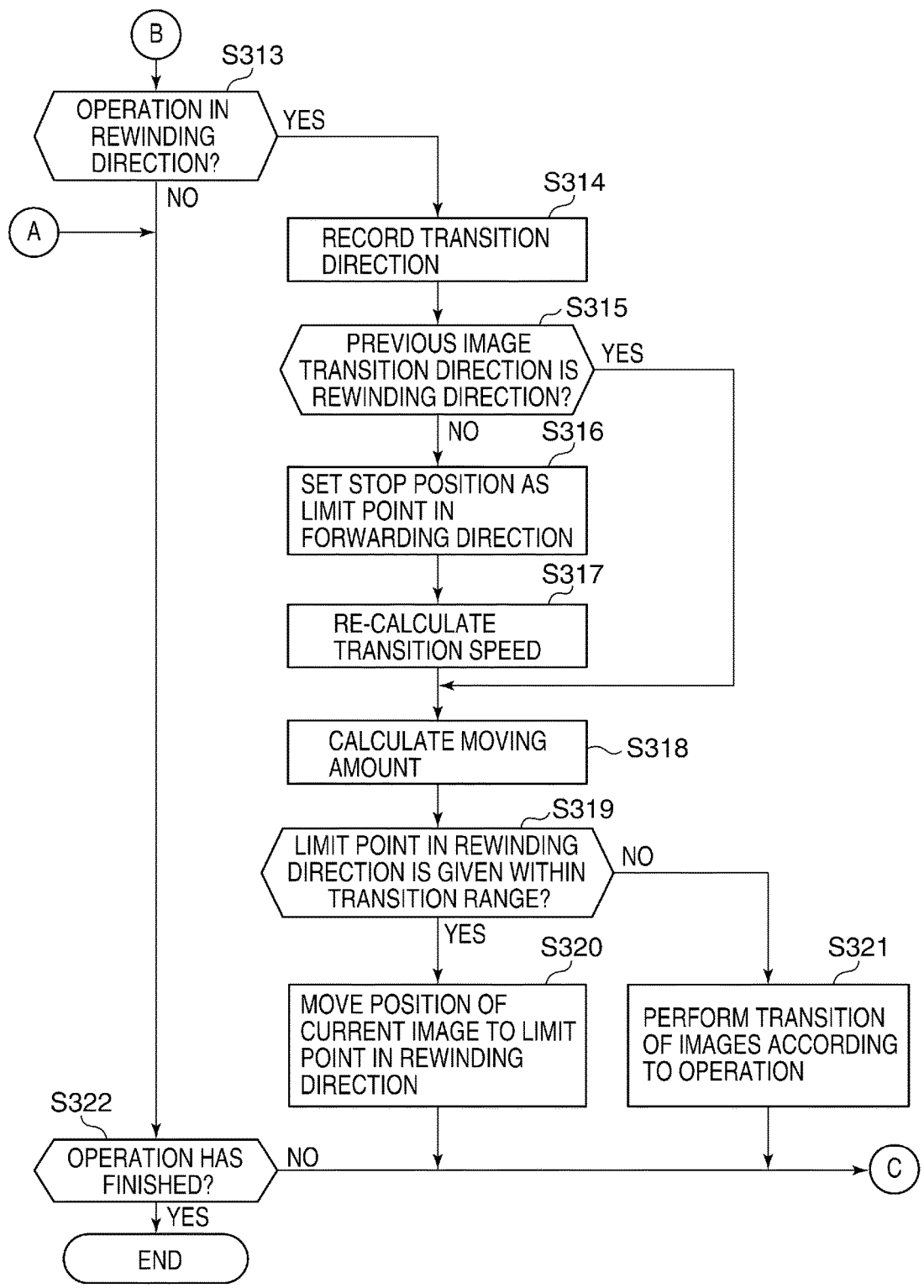
FIG. 3B is a flowchart showing the remaining part of the image transition process for retrieving the target image frame performed by the image retrieval apparatus shown in FIG. 1.

FIG. 3A and FIG. 3B are flowcharts showing an image transition process for retrieving the target image frame performed by the image retrieval apparatus shown in FIG. 1.

When the CPU 100 runs various programs including the control program loaded to the RAM 103 from the hard disk 101 etc., the process shown by the flowcharts in FIG. 3A and FIG. 3B is achieved. Moreover, a limit point is set to an image frame at which a transition direction by a transition operation is reversed as mentioned later in order to retrieve a target image frame in the illustrated image transition process.

When the image transition process is started, the CPU 100 determines whether the image transition operation was detected (step S301). In the description, the CPU 100 determines whether the input device 105 received any image transition operation, for example. When an image transition operation is not detected (NO in the step S301), the CPU 100 determines whether the image transition is in a temporary stop state (step S302). In the description, the CPU 100 determines whether no image transition operation was received during a predetermined time period and the image displayed in the transitional image display area 202 stops (temporary stop state) without moving. That is, the CPU 100 determines whether the image displayed in the transitional image display area 202 is in the stop state during the predetermined time period.

When the image transition is in the temporary stop state (YES in the step S302), the CPU 100 records the position of the image displayed in the transitional image display area 202 within the video image to the RAM 103 as a stop position (step S303). Then, the CPU 100 proceeds with the process to step S322 mentioned later. When the image transition is not in the temporary stop state (NO in the step S302), the CPU 100 proceeds with the process to step S322.

When detecting the image transition operation (YES in the step S301), the CPU 100 determines whether the operation direction of the image transition operation (an image transition direction) is a forwarding direction (step S304). When the image transition direction is the forwarding direction (YES in the step S304), the CPU 100 records that the image transition direction is the forwarding direction to the RAM 103 (step S305).

Subsequently, the CPU 100 determines whether the previous image transition direction is the forwarding direction (step S306). When the previous image transition direction is a rewinding direction (NO in the step S306), the CPU 100 determines that the image transition direction was changed from the rewinding direction to the forwarding direction. Then, the CPU 100 sets the stop position recorded in the step S303 as a limit point in the rewinding direction and records it to the RAM 103 (step S307). After that, the CPU 100 re-calculates transition speed (step S308) as mentioned later.

Next, the CPU 100 calculates a moving amount by the present image transition operation according to the number of frames of the video image (step S309). It should be noted that the CPU 100 proceeds with the process to step S309 when the previous image transition direction is the forwarding direction (YES in the step S306).

Subsequently, the CPU 100 determines whether the limit point in the forwarding direction is given between the position (position within the video image) of the image that is currently displayed in the transitional image display area 202 and a position of an image that is a destination of transition according to the moving amount (step S310). When the limit point in the forwarding direction is given (YES in the step S310), the CPU 100 designates the image at the position corresponding to the limit point as an image displayed in the transitional image display area 202 (step S311). That is, the CPU 100 moves the position of the current image to the limit point in the forwarding direction. In this case, the image transition is stopped at the limit point and is brought into the temporary stop state, and the image corresponding to the limit point concerned is displayed on the transitional image display area 202. It should be noted that the CPU 100 brings the image transition into the stop state when the current image position is the limit point in the forwarding direction.

When there is no limit point in the forwarding direction (NO in the step S310), the CPU 100 performs transition of images in the forwarding direction according to the moving amount calculated in the step S309 (step S312). That is, the CPU 100 moves the position of the current image to the image corresponding to the image transition operation. The CPU 100 returns the process to the step S301 after the process in the step S311 or S312.

When the image transition direction is not the forwarding direction (NO in the step S304), the CPU 100 determines whether the image transition direction is the rewinding direction (step S313). When the image transition direction is the rewinding direction (YES in the step S313), the CPU 100 records that the image transition direction is the rewinding direction to the RAM 103 (step S314). Then, the CPU 100 determines whether the previous image transition direction is the rewinding direction (step S315).

When the previous image transition direction is the forwarding direction (NO in the step S315), the CPU 100 determines that the image transition direction was changed from the rewinding direction to the forwarding direction. Then, the CPU 100 sets the stop position recorded in the step S303 as a limit point in the forwarding direction and records it to the RAM 103 (step S316). After that, the CPU 100 re-calculates transition speed (step S317) as mentioned later.

Subsequently, the CPU 100 calculates a moving amount by the present image transition operation according to the number of frames of the video image (step S318). It should be noted that the CPU 100 proceeds with the process to step S318 when the previous image transition direction is the rewinding direction (YES in the step S315).

Subsequently, the CPU 100 determines whether the limit point in the rewinding direction is given between the position (position within the video image) of the image that is currently displayed in the transitional image display area 202 and a position of an image that is a destination of transition according to the moving amount (step S319). When the limit point in the rewinding direction is given (YES in the step S319), the CPU 100 designates the image at the position corresponding to the limit point as an image displayed in the transitional image display area 202 (step S320). That is, the CPU 100 moves the position of the current image to the limit point in the rewinding direction. In this case, the image transition is stopped at the limit point and is brought into the temporary stop state, and the image corresponding to the limit point concerned is displayed on the transitional image display area 202. It should be noted that the CPU 100 brings the image transition into the stop state when the current image position is the limit point in the rewinding direction.

When there is no limit point in the rewinding direction (NO in the step S319), the CPU 100 performs transition of images in the rewinding direction according to the moving amount calculated in the step S318 (step S321). That is, the CPU 100 moves the position of the current image to the image corresponding to the image transition operation. The CPU 100 returns the process to the step S301 after the process in the step S320 or S321.

When the image transition direction is the forwarding direction (NO in the step S313), the CPU 100 determines whether the image transition operation has finished (step S322). When there is no image transition operation within a period that is longer than the above-mentioned period for determining the temporary stop state, the CPU 100 determines that the image transition operation has finished. When the image transition operation has not finished (NO in the step S322), the CPU 100 returns the process to the step S30122. On the other hand, when the image transition operation has finished (YES in the step S322), the CPU 100 finishes the image transition process.

Figure 4:
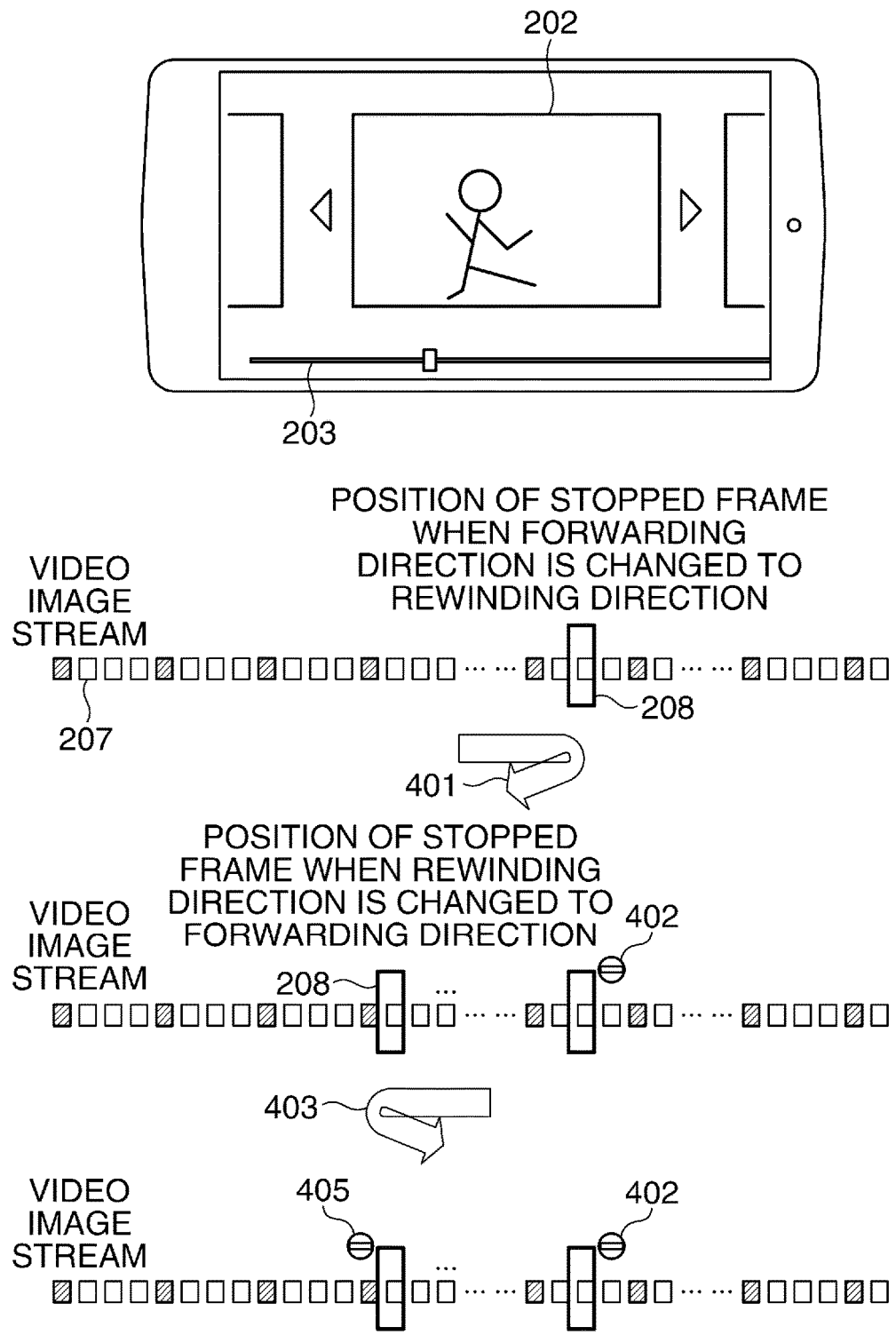
FIG. 4 is a view for describing a process for setting up limit points in a forwarding direction and rewinding direction that has been described with reference to FIG. 3A and FIG. 3B.

FIG. 4 is a view for describing a process for setting up limit points in the forwarding direction and rewinding direction that has been described with reference to FIG. 3A and FIG. 3B.

In the following description, the CPU 100 shall perform the transition process for images (image frames) in the forwarding direction. In this case, when the user changes the image transition direction to the rewinding direction as indicated by a reversal arrow 401 of the transition operation in FIG. 4, the CPU 100 determines that the image transition direction is the rewinding direction that is the opposite direction. In this case, the CPU 100 temporary stops the transition process. In the illustrated example, the CPU 100 temporary stops the image transition at the position of the displayed image mark 208 at the time when the direction of the transition operation is reversed. The position of this displayed image mark 208 is a stop position recorded in the RAM 103 in the step S303 shown in FIG. 3A.

After the temporary stop, the CPU 100 performs the transition process of images by setting the image transition direction to the rewinding direction. When determining that the image transition direction was reversed from the forwarding direction to the rewinding direction, the CPU 100 sets up the limit point 402 in the forwarding direction in the step S316 shown in FIG. 3B.

Subsequently, when the user reverses the image transition direction from the rewinding direction to the forwarding direction as shown by a reversal arrow 403 of the transition operation in FIG. 4, the CPU 100 determines that the image transition direction is the forwarding direction that is the opposite direction. In this case, the CPU 100 temporary stops the transition process. In the illustrated example, the CPU 100 temporary stops the image transition at the position of the displayed image mark 208 at the time when the direction of the transition operation is reversed. The position of this displayed image mark 208 is a stop position recorded in the RAM 103 in the step S303 shown in FIG. 3A.

After the temporary stop, the CPU 100 performs the transition process of images by setting the image transition direction to the rewinding direction. When determining that the image transition direction was reversed from the rewinding direction to the forwarding direction, the CPU 100 sets up the limit point 405 in the rewinding direction in the step S307 shown in FIG. 3A.

Thus, the CPU 100 sets up the limit points 402 and 405 in the forwarding direction and the rewinding direction according to the user's image transition operations. Then, the CPU 100 performs the transition process within the range between the limit points 402 and 405.

Figure 5:
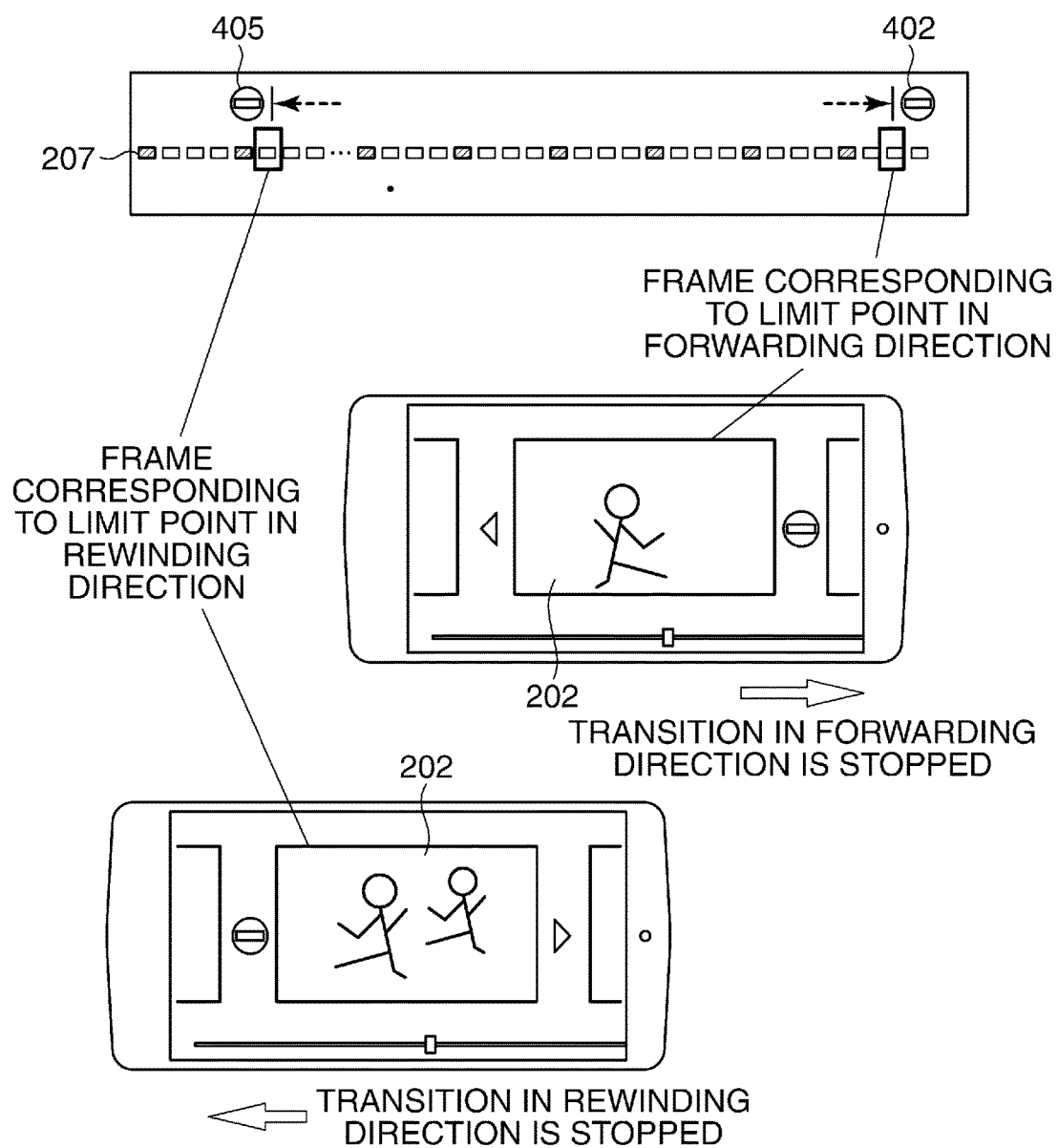
FIG. 5 is a view for describing a process to stop image transition at the limit points that has been described with reference to FIG. 3A and FIG. 3B.

FIG. 5 is a view for describing a process to stop the image transition at the limit points that has been described with reference to FIG. 3A and FIG. 3B.

As mentioned above, in the image transition process, the CPU 100 stops the image transition process, when the image transition reaches the limit point 402 in the forwarding direction or the limit point 405 in the rewinding direction. Then, when the image transition process is stopped, the CPU 100 displays the image corresponding to the limit point 402 or 405 in the transitional image display area 202. Then, when the image transition process is stopped at the limit point 402 in the forwarding direction, the CPU 100 does not perform the image transition in the forwarding direction beyond the image corresponding to the limit point 402 concerned henceforth. Similarly, when the image transition process is stopped at the limit point 405 in the rewinding direction, the CPU 100 does not perform the image transition in the rewinding direction beyond the image corresponding to the limit point 405 concerned henceforth.

FIG. 6A, FIG. 6B, and FIG. 6C are views for describing update of the limit points that has been described with reference to FIG. 3A and FIG. 3B. Then, FIG. 6A, FIG. 6B, and FIG. 6C show the update of the limit points in the video image stream.

As shown in FIG. 6A, the limit point 402 in the forwarding direction and the limit point 405 in the rewinding direction shall be set to the video image stream. When the limit points 402 and 405 are set up, the CPU 100 performs the image transition process within a transition permission range 605 defined by the limit points 402 and 405. It should be noted that the transition permission range 605 means a transition range in a case where an image transition operation is given without reversing the image transition direction in the description.

The image transition direction shall be reversed to the rewinding direction before reaching the limit point 402 in the forwarding direction during the image transition process in the forwarding direction as shown by a reversal arrow 601 of the transition operation in FIG. 6B. In this case, the CPU 100 sets up a new limit point 602 in the forwarding direction at the position of the image at which the image transition direction is reversed. As a result, the CPU 100 defines a transition permission range 606 by the limit point 602 in the forwarding direction and the limit point 405 in the rewinding direction.

Furthermore, the image transition direction shall be reversed to the forwarding direction before reaching the limit point 405 in the rewinding direction during the image transition process in the rewinding direction as shown by a reversal arrow 603 of the transition operation in FIG. 6C. In this case, the CPU 100 sets up a new limit point 604 in the rewinding direction at the position of the image at which the image transition direction is reversed. As a result, the CPU 100 defines a transition permission range 607 by the limit point 602 in the forwarding direction and the limit point 604 in the rewinding direction.

As mentioned above, the limit points will be set up and updated when the image transition direction is reversed by a user's transition operation. As a result, the image transition process stops at the limit points, and the transition permission range becomes narrow by an image transition operation. That is, when the user switches the image transition direction from the forwarding direction to the rewinding direction or from the rewinding direction to the forwarding direction by a transition operation, the transition permission range is set up by the transition operation concerned. Accordingly, the image transition process that the user does not intend is not performed, and the target image will be retrieved easily.

FIG. 7 is a view showing an example of data used in calculation of the transition speed in the image transition process described with reference to FIG. 3A and FIG. 3B.

As described with reference to FIG. 3A and FIG. 3B, when setting up the limit points and calculating the transition speed of the image transition by a subsequent transition operation, the CPU 100 calculates the transition speed according to the number of frames between the limit points. As shown in FIG. 7, "100%" is set up as the transition speed (ratio) corresponding to a predetermined initial value (1000 or more, for example) of the number of frames between the limit points. That is, "100%" is set up as the first transition speed. Then, the transition speed ratio is set up according to the number of frames between the limit points.

As illustrated, the transition speed becomes slow as the number of frames between the limit points decreases. At the beginning of the image transition process, the limit point in the rewinding direction is set at the position of the first image of the video image stream, and the limit point in the forwarding direction is set at the position of the last image of the video image stream. Then, the number of frames between the limit points (i.e., the number of frames of the video image stream) is set up as the initial value, and the transition speed corresponding to the initial value concerned is set to "100%".

In the illustrated example, when the number of frames between the limit points that is set up or changed in the image transition process described with reference to FIG. 3A and FIG. 3B becomes 100 or less, the CPU 100 sets up the transition speed to 25% of the transition speed corresponding to the initial value.

Although the transition speed is determined with using the number of frames between the limit points in the above-mentioned example, shooting time between limit points, or a ratio between a length (the number of frames or shooting time) of the entire video image stream and a length (the number of frames or shooting time) of a video image between limit points may be used.

Since the transition speed is calculated as mentioned above, the image transition speed becomes slower as the transition permission range becomes narrower, which enables the user to retrieve a desired image easily.

Thus, since the transition permission range of the image transition is set up according to a user's transition operation in the first embodiment of the present invention, a user is able to retrieve a desired image in a short time.

Subsequently, one example of an image retrieval apparatus according to a second embodiment of the present invention will be described. It should be noted that the configuration of the image retrieval apparatus according to the second embodiment is the same as that of the image retrieval apparatus shown in FIG. 1.

Figures 8A, 8B, 8C:
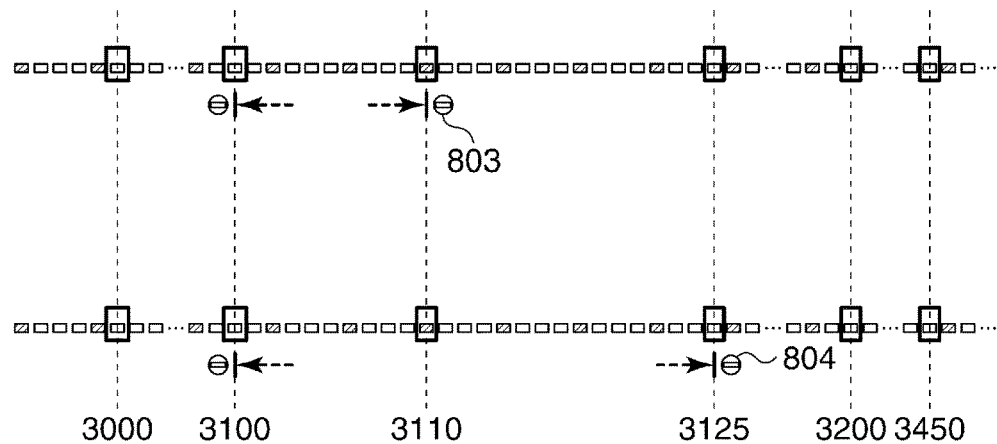
FIG. 8A, FIG. 8B, and FIG. 8C are views for describing setting of limit points in an image retrieval apparatus according to a second embodiment of the present invention.

FIG. 8A, FIG. 8B, and FIG. 8C are views for describing setting of limit points in the image retrieval apparatus according to the second embodiment of the present invention. FIG. 8A is a view showing an example of limit point information. FIG. 8B is a view showing an example of a video image stream. Moreover, FIG. 8C is a view showing another example of the limit point information.

The image retrieval apparatus in the second embodiment also sets up and updates limit points in the same manner as the first embodiment. As described with reference to FIG. 3A, FIG. 3B, and FIG. 6, when the transition direction is reversed before reaching a limit point, the CPU 100 stops the image transition process, and sets up a new limit point at the reversed position concerned. That is, the CPU 100 sets up and records a limit point in the forwarding direction and a limit point in the rewinding direction independently. Then, the number of the recorded limit points in the forwarding direction may differ from the number of the recorded limit points in the rewinding direction.

As shown in FIG. 8A, the limit point information includes a history of the limit points in the rewinding direction and a history of the limit points in the forwarding direction. Initial values of the limit points are set up according to the number of frames of a video image stream. For example, when the number of frames of a video image stream is 20000, the frame number 1 is set as the initial value of the limit point in the rewinding direction, and the frame number 20000 is set as the initial value of the limit point in the forwarding direction.

The numbers of frames at which the rewinding operations were changed to the forwarding operations are recorded as the limit points in the rewinding direction. In the example in FIG. 8A, the effective limit point in the rewinding direction is updated from the frame number 3000 to the frame number 3100.

The numbers of frames at which the forwarding operations were changed to the rewinding operations are recorded as the limit points in the forwarding direction. In the example in FIG. 8A, the effective limit point in the forwarding direction is updated in order of the frame number 3450, the frame number 3200, the frame number 3125, and the frame number 3110. It should be noted that a plurality of limit points are set to the video image stream (see FIG. 8B) according to the limit point information shown in FIG. 8A.

Next, a deletion process for a limit point will be described with reference to FIG. 8B.

When a limit point 803 in the forwarding direction is set to the frame number 3110 as shown in an upper video image stream in FIG. 8B, the transition process stops at this limit point 803 and the transition process in the forwarding direction will not be performed beyond the frame corresponding to the limit point 803. However, when a transition operation in the forwarding direction is further given after the transition process stopped at the limit point 803 in the forwarding direction, the CPU 100 deletes the limit point 803 corresponding to the frame number 3110 and sets a limit point 804 corresponding to a last frame number 3125 as the effective limit point in the forwarding direction in the limit point information as shown in a lower video image stream in FIG. 8B.

When the limit point 803 is deleted as mentioned above, the limit point corresponding to the frame number 3110 is deleted and the frame number 3125 is set up as the effective limit point in the limit point information as shown in FIG. 8C.

Figure 9A:
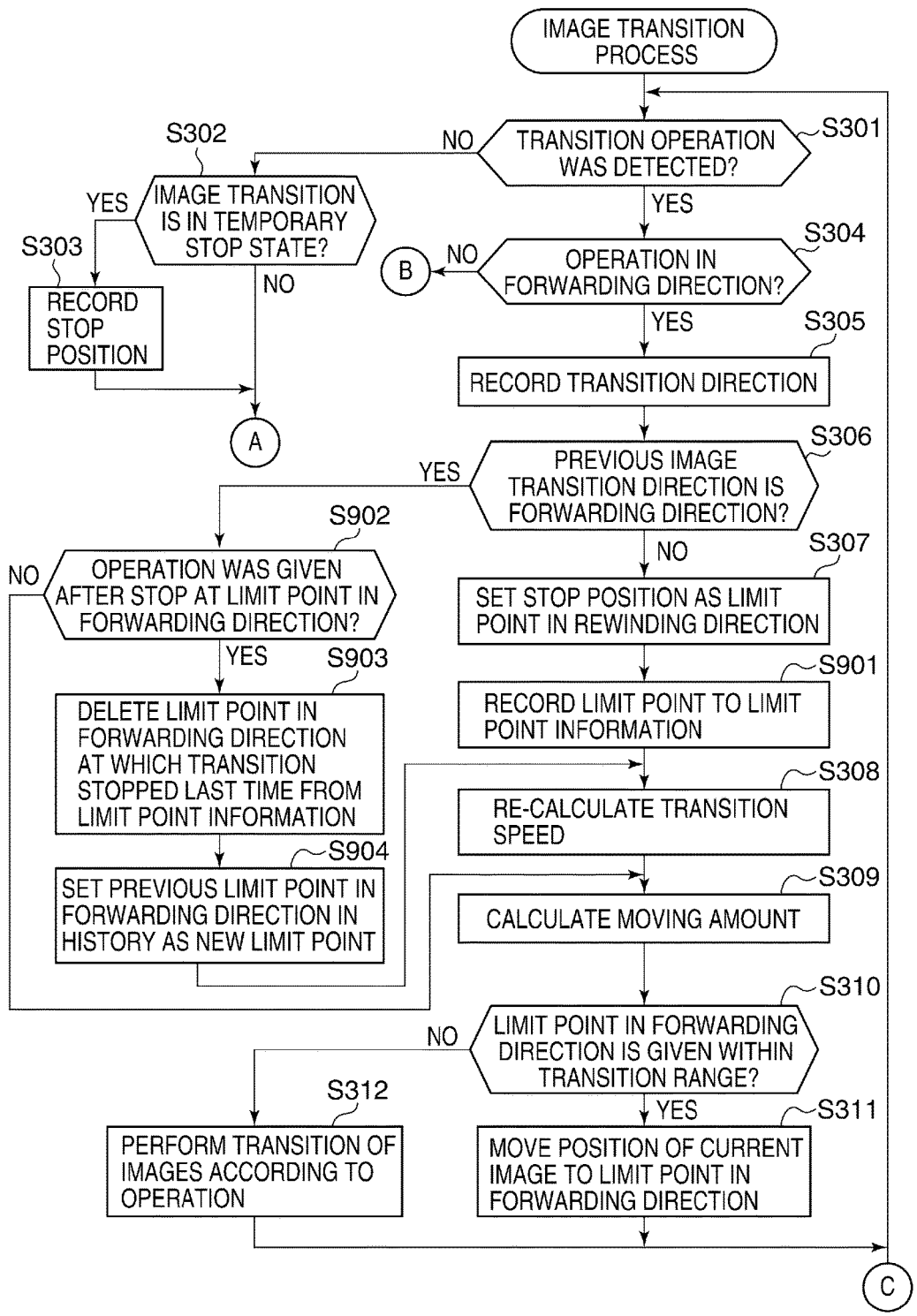
FIG. 9A is a flowchart showing a part of an image transition process performed by the image retrieval apparatus according to the second embodiment.
Figure 9B:
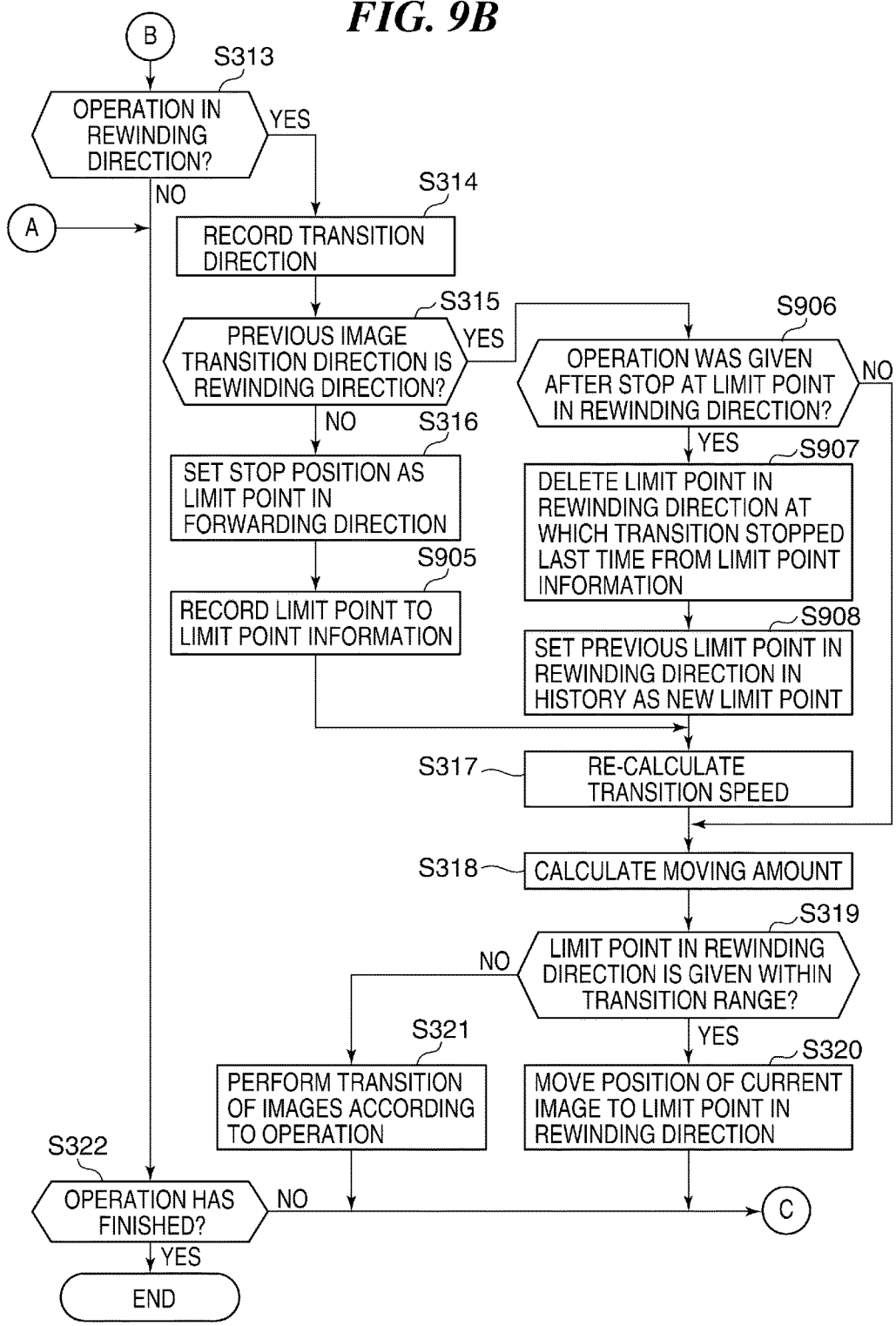
FIG. 9B is a flowchart showing the remaining part of the image transition process performed by the image retrieval apparatus according to the second embodiment.

FIG. 9A and FIG. 9B are flowcharts showing an image transition process performed by the image retrieval apparatus according to the second embodiment of the present invention. It should be noted that the steps in the illustrated flowcharts that are identical to the steps in FIG. 3A and FIG. 3B are indicated by the same reference numbers and their descriptions are omitted.

After the process in the step S307 described with reference to FIG. 3A, the CPU 100 additionally records the limit point in the rewinding direction to the limit point information (step S901). Then, the CPU 100 proceeds with the process to the step S308.

When the previous image transition direction is the forwarding direction (YES in the step S306), the CPU 100 determines whether the user's operation was given after the image transition stopped at the limit point in the forwarding direction (step S902). When the operation was given after the image transition stopped at the limit point in the forwarding direction (YES in the step S902), the CPU 100 deletes the limit point in the forwarding direction at which the image transition stopped last time from the limit point information (step S903). Then, the CPU 100 sets the previous limit point of the limit point in the forwarding direction deleted from the limit point information (i.e., history information) as a new limit point in the forwarding direction (step S904). Then, the CPU 100 proceeds with the process to the step S308.

When the user's operation was not given after the image transition stopped at the limit point in the forwarding direction (NO in the step S902), the CPU 100 proceeds with the process to the step S309 described with reference to FIG. 3A.

When the limit point is added to the limit point information in the step S901 or when the last limit point is set up as the limit point in the forwarding direction in the step S904, the number of frames between the limit points is changed. Accordingly, the CPU 100 re-calculates the transition speed in the step S308.

After the process in the step S316, the CPU 100 additionally records the limit point in the forwarding direction to the limit point information (step S905). Then, the CPU 100 proceeds with the process to the step S317.

When the previous image transition direction is the rewinding direction (YES in the step S315), the CPU 100 determines whether the user's operation was given after the image transition stopped at the limit point in the rewinding direction (step S906). When the operation was given after the image transition stopped at the limit point in the rewinding direction (YES in the step S906), the CPU 100 deletes the limit point in the rewinding direction at which the image transition stopped last time from the limit point information (step S907). Then, the CPU 100 sets the previous limit point of the limit point in the rewinding direction deleted from the limit point information (i.e., history information) as a new limit point in the rewinding direction (step S908). Then, the CPU 100 proceeds with the process to the step S317.

When the user's operation was not given after the image transition stopped at the limit point in the rewinding direction (NO in the step S906), the CPU 100 proceeds with the process to the step S318 described with reference to FIG. 3B.

When the limit point is added to the limit point information in the step S905 or when the last limit point is set up as the limit point in the rewinding direction in the step S908, the number of frames between the limit points is changed. Accordingly, the CPU 100 re-calculates the transition speed in the step S317.

Thus, the image retrieval apparatus according to the second embodiment of the present invention is provided with the limit point information that shows the history of the limit points, and re-calculates the transition speed when the number of frames between the limit points is changed. As a result, the transition speed becomes fast as the number of frames between the limit points increases, and the transition speed becomes slow as the number of frames between the limit points decreases, which enables the user to retrieve a desired image easily.

As is clear from the above description, the CPU 100 functions as the display control unit and the setting unit in the example shown in FIG. 1.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the functions of the above-mentioned embodiments may be achieved as a control method that is executed by the image retrieval apparatus. Moreover, the computer with which the image retrieval apparatus is provided may execute a program that has the functions of the above-mentioned embodiments. It should be noted that the control program is recorded into a computer-readable storage medium, for example.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2016-110034, filed Jun. 1, 2016, which is hereby incorporated by reference herein in its entirety.

What is claimed is:

1. An image retrieval apparatus that retrieves a predetermined image from a plurality of images shot continuously, the image retrieval apparatus comprising:
  a display control unit configured to display the plurality of images on a display unit in order in either of a first transition direction and a second transition direction that is opposite to the first transition direction according to a user's operation; and
  a setting unit configured to set up a limit point in the first transition direction when the direction in which the images are displayed in order is switched from the first transition direction to the second transition direction based on an image displayed at a time of switching concerned, and to set up a limit point in the second transition direction when the direction in which the images are displayed in order is switched from the second transition direction to the first transition direction based on an image displayed at a time of switching concerned,
  wherein said display control unit stops displaying the images in order in the first transition direction when a displayed image reaches an image corresponding to the limit point in the first transition direction during the images are displayed in order in the first transition direction, and stops displaying the images in order in the second transition direction when a displayed image reaches an image corresponding to the limit point in the second transition direction during the images are displayed in order in the second transition direction.

2. The image retrieval apparatus according to claim 1, wherein said display control unit determines transition speed at which the images are displayed in order based on the limit point in the first transition direction and the limit point in the second transition direction.

3. The image retrieval apparatus according to claim 2, wherein said display control unit determines the transition speed according to a length defined by the limit point in the first transition direction and the limit point in the second transition direction.

4. The image retrieval apparatus according to claim 2, wherein said display control unit determines the transition speed according to the number of images between the limit point in the first transition direction and the limit point in the second transition direction.

5. The image retrieval apparatus according to claim 2, wherein said display control unit determines the transition speed according to shooting time of images between the limit point in the first transition direction and the limit point in the second transition direction.

6. The image retrieval apparatus according to claim 2, wherein said display control unit determines the transition speed according to a ratio between a length of the plurality of images and a length of images within a range defined by the limit point in the first transition direction and the limit point in the second transition direction.

7. The image retrieval apparatus according to claim 1, wherein said setting unit stores information about a history of limit points that were set.

8. The image retrieval apparatus according to claim 7, wherein said setting unit changes and sets up the information about the limit point in the first transition direction when a user's operation instructs to display the images in order in the first transition direction after said display control unit stopped displaying the images in order in the first transition direction, and wherein said setting unit changes and sets up the information about the limit point in the second transition direction when a user's operation instructs to display the images in order in the second transition direction after said display control unit stopped displaying the images in order in the second transition direction.

9. A control method for an image retrieval apparatus that retrieves a predetermined image from a plurality of images shot continuously, the control method comprising:
  a display control step of displaying the plurality of images on a display unit in order in either of a first transition direction and a second transition direction that is opposite to the first transition direction according to a user's operation;
  a first setting step of setting up a limit point in the first transition direction when the direction in which the images are displayed in order is switched from the first transition direction to the second transition direction based on an image displayed at a time of switching concerned;
  a second setting step of setting up a limit point in the second transition direction when the direction in which the images are displayed in order is switched from the second transition direction to the first transition direction based on an image displayed at a time of switching concerned;
  a first stop step of stopping displaying the images in order in the first transition direction when a displayed image reaches an image corresponding to the limit point in the first transition direction during the images are displayed in order in the first transition direction; and
  a second stop step of stopping displaying the images in order in the second transition direction when a displayed image reaches an image corresponding to the limit point in the second transition direction during the images are displayed in order in the second transition direction.

10. A non-transitory computer-readable storage medium storing a control program causing a computer to execute a control method for an image retrieval apparatus that retrieves a predetermined image from a plurality of images shot continuously, the control method comprising:
  a display control step of displaying the plurality of images on a display unit in order in either of a first transition direction and a second transition direction that is opposite to the first transition direction according to a user's operation;
  a first setting step of setting up a limit point in the first transition direction when the direction in which the images are displayed in order is switched from the first transition direction to the second transition direction based on an image displayed at a time of switching concerned;

a second setting step of setting up a limit point in the second transition direction when the direction in which the images are displayed in order is switched from the second transition direction to the first transition direction based on an image displayed at a time of switching concerned;

a first stop step of stopping displaying the images in order in the first transition direction when a displayed image reaches an image corresponding to the limit point in the first transition direction during the images are displayed in order in the first transition direction; and a second stop step of stopping displaying the images in order in the second transition direction when a displayed image reaches an image corresponding to the limit point in the second transition direction during the images are displayed in order in the second transition direction.

11. An information processing apparatus comprising:

a processor; and a memory storing a program which, when executed by the processor, causes the information processing apparatus to:

display the plurality of images on a display unit in order in either of a first transition direction and a second transition direction that is opposite to the first transition direction according to a user's operation;

set up a limit point in the first transition direction when the direction in which the images are displayed in order is switched from the first transition direction to the second transition direction based on an image displayed at a time of switching concerned; and set up a limit point in the second transition direction when the direction in which the images are displayed in order is switched from the second transition direction to the first transition direction based on an image displayed at a time of switching concerned, wherein displaying the images in order in the first transition direction is stopped when a displayed image reaches an image corresponding to the limit point in the first transition direction during the images are displayed in order in the first transition direction, and displaying the images in order in the second transition direction is stopped when a displayed image reaches an image corresponding to the limit point in the second transition direction during the images are displayed in order in the second transition direction.

12. The information processing apparatus according to claim 11, wherein transition speed at which the images are displayed in order is determined based on the limit point in the first transition direction and the limit point in the second transition direction.

13. The information processing apparatus according to claim 12, the transition speed is determined according to a length defined by the limit point in the first transition direction and the limit point in the second transition direction.

14. The information processing apparatus according to claim 12, wherein the transition speed is determined according to the number of images between the limit point in the first transition direction and the limit point in the second transition direction.

15. The information processing apparatus according to claim 12, wherein the transition speed is determined according to shooting time of images between the limit point in the first transition direction and the limit point in the second transition direction.

16. The information processing apparatus according to claim 12, wherein the transition speed is determined according to a ratio between a length of the plurality of images and a length of images within a range defined by the limit point in the first transition direction and the limit point in the second transition direction.

17. The information processing apparatus according to claim 11, wherein information about a history of limit points that were set is stored.

18. A non-transitory computer-readable storage medium storing a control program causing a computer to execute a control method for an image processing apparatus, the control method comprising:

a display control step of displaying the plurality of images on a display unit in order in either of a first transition direction and a second transition direction that is opposite to the first transition direction according to a user's operation;

a first setting step of setting up a limit point in the first transition direction when the direction in which the images are displayed in order is switched from the first transition direction to the second transition direction based on an image displayed at a time of switching concerned;

a second setting step of setting up a limit point in the second transition direction when the direction in which the images are displayed in order is switched from the second transition direction to the first transition direction based on an image displayed at a time of switching concerned;

a first stop step of stopping displaying the images in order in the first transition direction when a displayed image reaches an image corresponding to the limit point in the first transition direction during the images are displayed in order in the first transition direction; and a second stop step of stopping displaying the images in order in the second transition direction when a displayed image reaches an image corresponding to the limit point in the second transition direction during the images are displayed in order in the second transition direction.

* * * * *